US008903651B2

(12) United States Patent
Homma et al.

(10) Patent No.: US 8,903,651 B2
(45) Date of Patent: Dec. 2, 2014

(54) INFORMATION TERMINAL, SERVER DEVICE, SEARCHING SYSTEM, AND SEARCHING METHOD THEREOF

(71) Applicant: Clarion Co., Ltd., Saitama (JP)

(72) Inventors: Takeshi Homma, Tokyo (JP); Kouichirou Fukunaga, Saitama (JP); Norio Watarai, Saitama (JP); Masataka Motohashi, Saitama (JP); Yasunari Obuchi, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 72 days.

(21) Appl. No.: 13/624,071

(22) Filed: Sep. 21, 2012

(65) Prior Publication Data

US 2013/0080056 A1    Mar. 28, 2013

(30) Foreign Application Priority Data

Sep. 22, 2011    (JP) .................................. 2011-207495

(51) Int. Cl.
*G01C 21/36* (2006.01)
*G10L 15/26* (2006.01)
(Continued)

(52) U.S. Cl.
CPC ........... *G10L 21/0208* (2013.01); *G10L 15/265* (2013.01); *G01C 21/00* (2013.01);
(Continued)

(58) Field of Classification Search
CPC ............... B60R 16/0373; G01C 21/36; G01C 21/3608; G01C 21/3629; G01C 21/367; G01C 21/3655; G01C 21/3461; G01S 1/66; G08G 1/096872

USPC ......... 701/419, 427–428, 431, 441, 443, 488, 701/539
See application file for complete search history.

(56) References Cited

U.S. PATENT DOCUMENTS 6,381,535 B1 *   4/2002   Durocher et al. ............. 701/423
7,092,819 B2 *   8/2006   Odachi et al. ................ 701/533
(Continued)

FOREIGN PATENT DOCUMENTS

JP     2006-349427 A    12/2006
WO    WO 2009/145796 A1    12/2009

OTHER PUBLICATIONS

European Search Report dated May 24, 2013 (sixteen (16) pages).

(Continued)

*Primary Examiner* — Mary Cheung
*Assistant Examiner* — Atul Trivedi
(74) *Attorney, Agent, or Firm* — Crowell & Moring LLP

(57) ABSTRACT

An object of the present invention is to provide a technique of an information terminal that allows more efficient utilization of high-level searching functions. The information terminal is provided with an audio input accepting unit to accept an input of speech information, a communication unit to establish communication with a predetermined server device via a network, an output unit, a POI specifying unit to transmit the speech information accepted by the audio input accepting unit to the server device and receive information specifying a candidate of a POI (Point Of Interest) associated with the speech information, a POI candidate output unit to output to the output unit, the information specifying the candidate of the POI received by the POI specifying unit, and a route searching unit to accept a selective input of the information specifying the candidate of the POI, and search for a route directed to the POI.

12 Claims, 12 Drawing Sheets

(51) Int. Cl.
  *G01C 21/00*  (2006.01)
  *G10L 15/30*  (2013.01)
  *G10L 15/22*  (2006.01)
  *G10L 21/0208*  (2013.01)
  *G01S 1/66*  (2006.01)
  *G06G 7/78*  (2006.01)
  *G10L 19/24*  (2013.01)
  *G10L 25/60*  (2013.01)
  *G10L 19/00*  (2013.01)

(52) U.S. Cl.
  CPC ............... *G10L 19/24* (2013.01); *G10L 25/60* (2013.01); *G10L 15/30* (2013.01); *G01C 21/3679* (2013.01); *G10L 15/22* (2013.01); *G10L 15/26* (2013.01); *G10L 19/0018* (2013.01); *G01C 21/3608* (2013.01)
  USPC ........... 701/427; 701/419; 701/428; 701/429; 701/430; 701/431; 701/441; 701/443; 701/488; 701/539

(56) References Cited

U.S. PATENT DOCUMENTS

| | | | |
|---|---|---|---|
| 7,579,939 B2 * | 8/2009 | Schofield et al. | 340/425.5 |
| 7,579,940 B2 * | 8/2009 | Schofield et al. | 340/425.5 |
| 8,068,942 B2 * | 11/2011 | Breed | 701/1 |
| 8,194,646 B2 * | 6/2012 | Elliott et al. | 370/352 |
| 8,290,778 B2 * | 10/2012 | Gazdzinski | 704/270 |
| 2002/0027886 A1 * | 3/2002 | Fischer et al. | 370/255 |
| 2005/0128106 A1 * | 6/2005 | Nakaishi et al. | 340/988 |
| 2005/0187709 A1 * | 8/2005 | Ohdachi | 701/211 |
| 2006/0153176 A1 * | 7/2006 | Caswell et al. | 370/356 |
| 2006/0223512 A1 | 10/2006 | Runge et al. | |
| 2007/0203700 A1 * | 8/2007 | Toyama | 704/251 |
| 2007/0219718 A1 * | 9/2007 | Pennock et al. | 701/211 |
| 2008/0095339 A1 * | 4/2008 | Elliott et al. | 379/93.01 |
| 2008/0177994 A1 * | 7/2008 | Mayer | 713/2 |
| 2009/0046593 A1 * | 2/2009 | Ptasinski et al. | 370/252 |
| 2010/0088096 A1 | 4/2010 | Parsons | |
| 2010/0145700 A1 * | 6/2010 | Kennewick et al. | 704/257 |
| 2011/0022292 A1 * | 1/2011 | Shen et al. | 701/200 |
| 2011/0066634 A1 | 3/2011 | Phillips et al. | |

OTHER PUBLICATIONS

Kumiko T. Boike et al., "Effect of Compression Ratio on Speech Recognition and Speech-Quality Ratings with Wide Dynamic Range Compression Amplification", Journal of Speech, Language, and Hearing Research, vol. 43, Apr. 2000 pp. 1-2 XP-002691287 (Abstract).

Partial European Search Report dated Jan. 31, 2013 (four (4) pages).

* cited by examiner

Link table 200

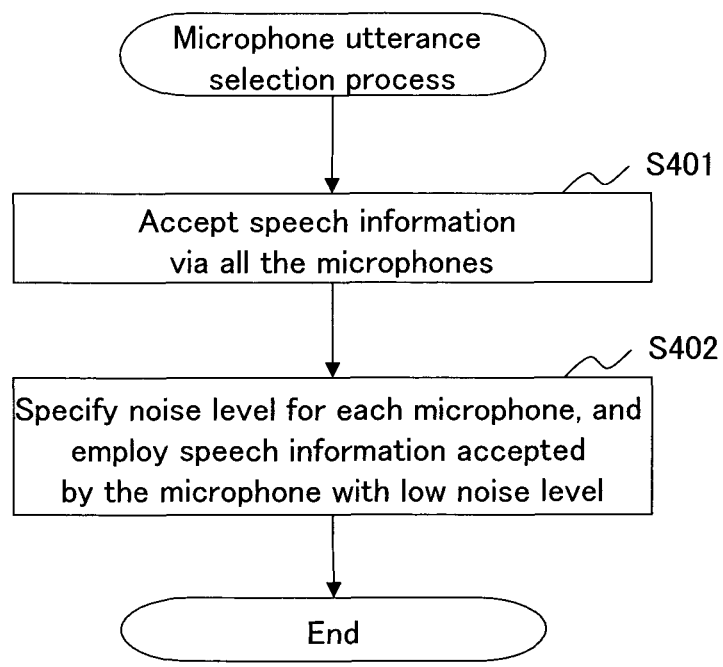

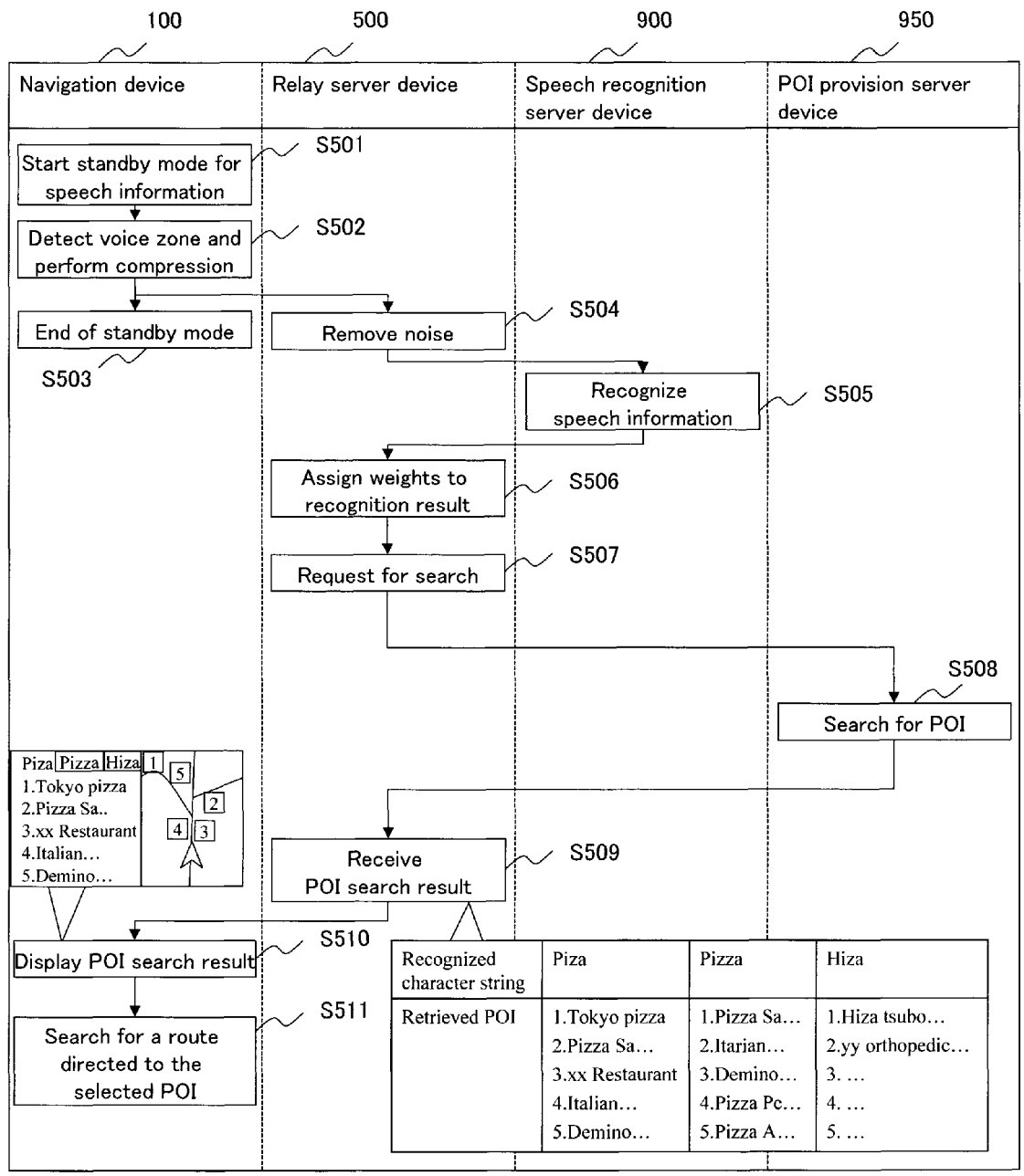

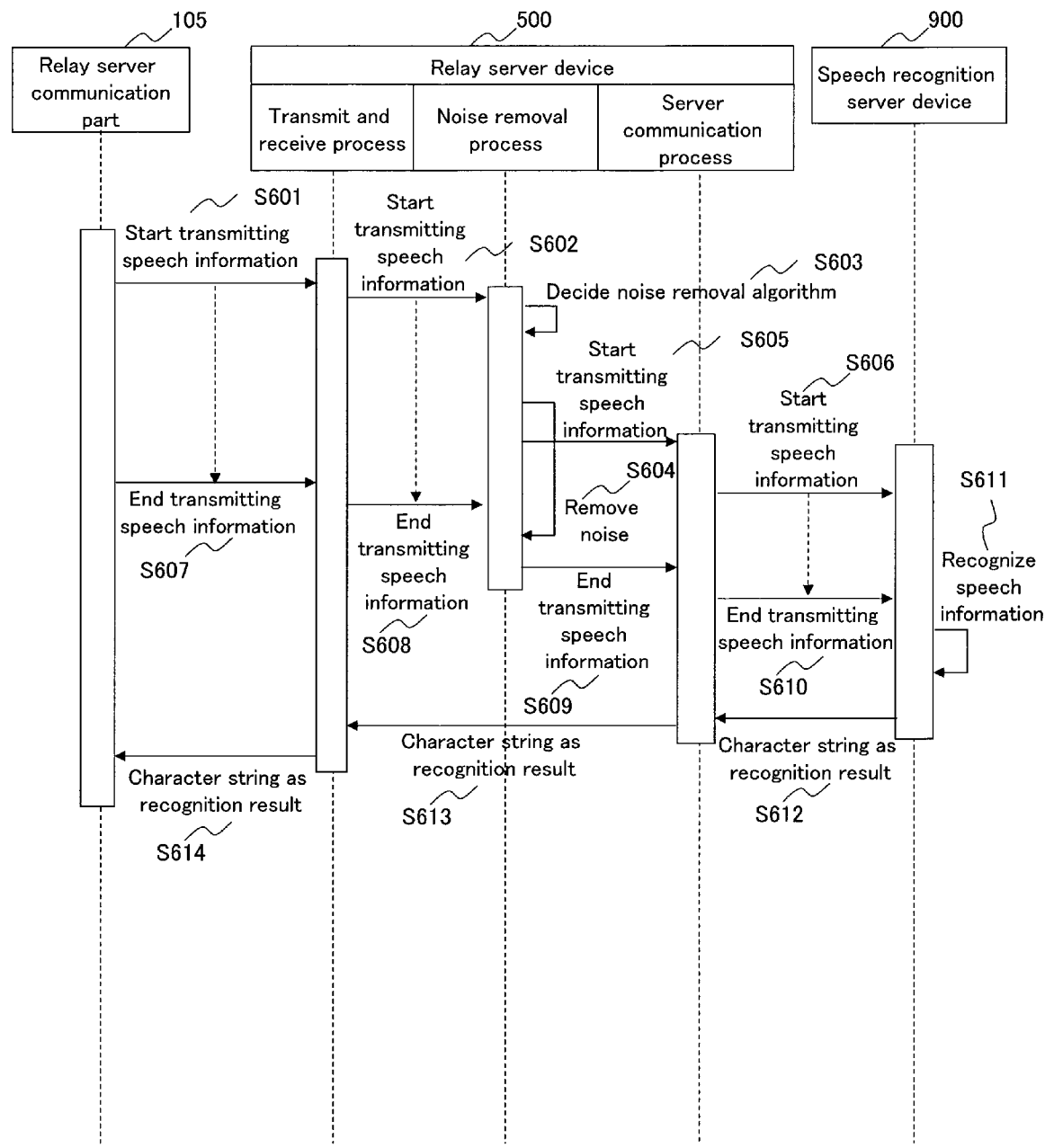

INFORMATION TERMINAL, SERVER DEVICE, SEARCHING SYSTEM, AND SEARCHING METHOD THEREOF

BACKGROUND OF THE INVENTION

1. Field of the Invention

The present invention relates to a technique of an information terminal. This application claims priority based on a Japanese Patent Application No. 2011-207495 filed on Sep. 22, 2011, the entire contents of which are incorporated by reference herein.

2. Description of the Related Art

Conventionally, an information terminal such as a navigation device employs a technique for accepting an audio input via a microphone or the like, and searching for a geographical name which is assumed as a destination, a via point, or the like. Japanese Unexamined Patent Application Publication No. 2006-349427, hereinafter, referred to as Patent Document 1, describes a technique regarding this type of navigation device.

SUMMARY OF THE INVENTION

In this type of navigation device as described above, the navigation device recognizes voice and performs a process that searches a dictionary for a facility name, or the like, being a candidate. Therefore, in order to provide a more enhanced searching function, it is necessary to employ an extremely high-performance device, considering a processing load on the navigation device.

An object of the present invention is to provide a technique of an information terminal which allows utilization of high-level searching function, more easily and simply.

In order to solve the problem described above, the information terminal relating to the present invention is provided with an audio input accepting unit adapted to accept an input of speech information, a communication unit adapted to establish communication with a predetermined server device via a network, an output unit, a POI specifying unit adapted to transmit the speech information accepted by the audio input accepting unit to the server device and receive information specifying a candidate of a POI (Point Of Interest) associated with the speech information, a POI candidate output unit adapted to output to the output unit, the information specifying the candidate of the POI received by the POI specifying unit, and a route searching unit adapted to accept a selective input of the information specifying the candidate of the POI and searching for a route directed to the POI, wherein the POI specifying unit compresses the speech information accepted by the audio input accepting unit with a predetermined compression rate and transmits the compressed speech information to the server device, and when a quality of the speech information being accepted by the audio input accepting unit is equal to or lower than a predetermined level, the POI specifying unit sets the predetermined compression rate to be a value which mitigates deterioration of the quality.

The server device relating to the present invention is provided with a speech information receiving unit adapted to receive speech information from a predetermined information terminal via a network, a noise removing unit adapted to remove noise information from the speech information, a speech information transmitting unit adapted to transmit the speech information from which the noise has been removed to a predetermined speech recognizer via the network, a character string receiving unit adapted to receive via the network, a character string as a result of recognition of the speech information by the speech recognizer, a character string transmitting unit adapted to transmit the character string via the network, to a predetermined POI provider for providing POI (Point Of Interest) information associated with the character string, a POI information receiving unit adapted to receive via the network, the POI information associated with the character string, and a POI information transmitting unit adapted to transmit the POI information to the information terminal.

A searching system relating to the present invention has an information terminal and a server device communicating with the information terminal via a network, wherein the information terminal is provided with an audio input accepting unit adapted to accept an input of speech information, a communication unit adapted to establish communication with the server device via the network, an output unit, a POI specifying unit adapted to transmit the speech information accepted by the audio input accepting unit to the server device and receiving information specifying a candidate of a POI (Point Of Interest) associated with the speech information, a POI candidate output unit adapted to output to the output unit, the information specifying the candidate of the POI received by the POI specifying unit, and a route searching unit adapted to accept a selective input of the information specifying the candidate of the POI and searching for a route directed to the POI, and the server device is provided with a speech information receiving unit adapted to receive the speech information from the information terminal via the network, a noise removing unit adapted to remove noise information from the speech information, a speech information transmitting unit adapted to transmit the speech information from which the noise has been removed to a predetermined speech recognizer, a POI information receiving unit adapted to receive via the network, POI information associated with the speech information transmitted to the speech recognizer, and a POI information transmitting unit adapted to transmit the POI information to the information terminal.

A searching method relating to the present invention is a method of a searching system having an information terminal and a server device communicating with the information terminal via a network, the searching system being provided with an audio input accepting unit adapted to accepting an input of speech information and an output unit, the searching method including a transmitting step of transmitting the speech information accepted by the audio input accepting unit to the server device, a speech information receiving step of receiving the speech information from the information terminal via the network, a noise removing step of removing noise information from the speech information, a speech information transmitting step of transmitting the speech information from which the noise has been removed to a predetermined speech recognizer via the network, a POI information receiving step of receiving from the speech recognizer via the network, POI (Point Of Interest) information associated with the speech information transmitted to the speech recognizer, a POI information transmitting step of transmitting the POI information to the information terminal, a POI specifying step of receiving the POI information, and a POI candidate outputting step of outputting to the output unit, the POI information received by the POI specifying step.

According to the present invention, it is possible to provide a technique of an information terminal which allows utilization of high-level searching function more easily and simply.

BRIEF DESCRIPTION OF DRAWINGS

FIG. 10 is a flow diagram of a microphone utterance selection process;

FIG. 11 illustrates a flow of a modified example of the information searching process; and FIG. 12 is a sequence diagram in an alternative modified example of the information searching process.

DESCRIPTION OF THE PREFERRED EMBODIMENTS

Hereinafter, a navigation device and a searching system to which the first embodiment of the present invention has been applied will be explained, with reference to the accompanying drawings.

Figure 1:
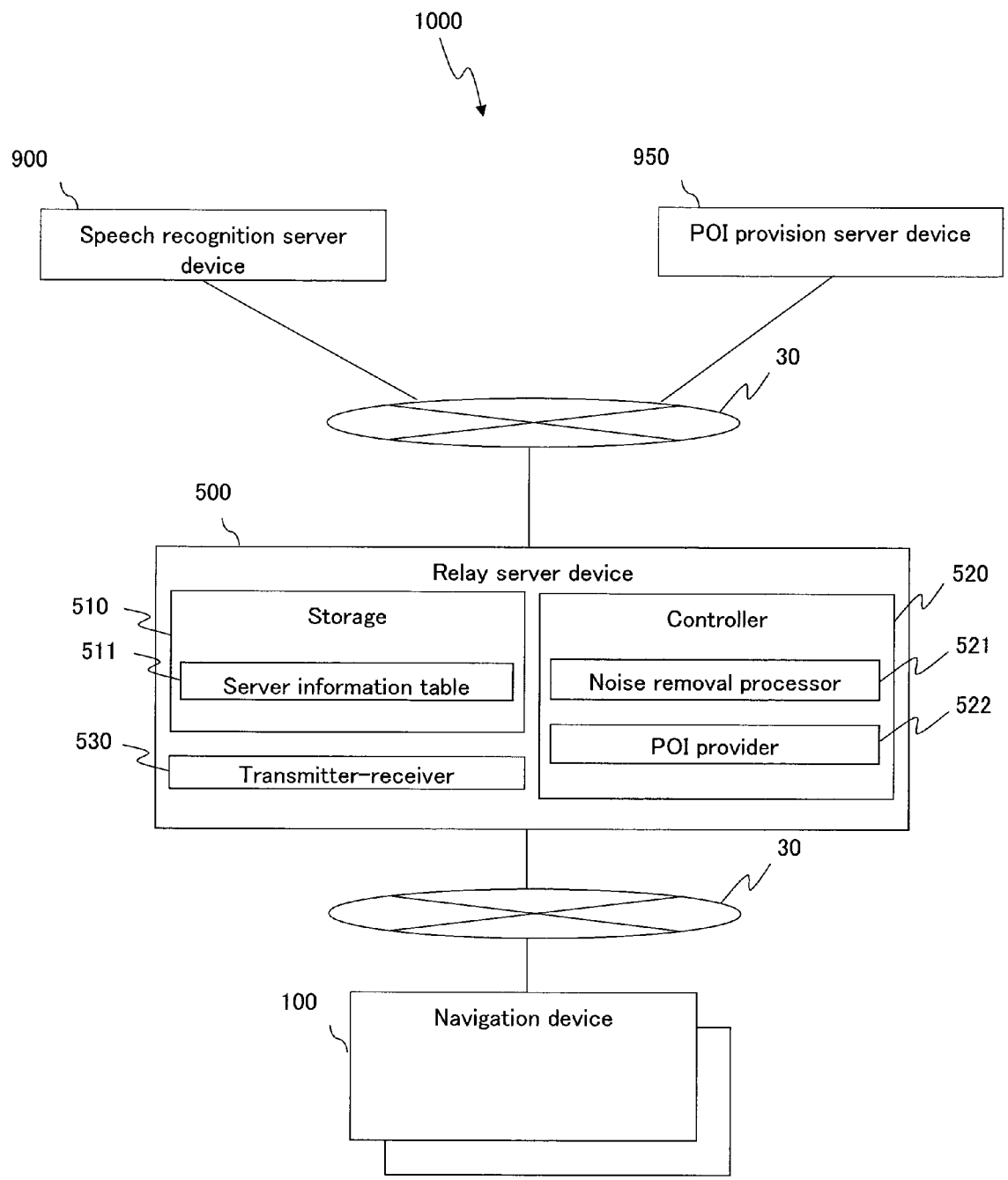
FIG. 1 is a schematic diagram showing a searching system.

FIG. 1 is an overall block diagram showing the searching system 1000. The searching system 1000 incorporates a navigation device 100 mounted on a vehicle, a relay server device 500, a speech recognition server device 900, and a POI provision server device 950, which are connectable via a network 30 such as a global network including the Internet, LAN (Local Area Network), WAN (Wide Area Network), and a mobile telephone network.

Here, the speech recognition server device 900 is a device for implementing a speech recognition service that is provided by a predetermined carrier, or the like, via the network 30. In the present embodiment, upon receipt of transmitted speech information (waveform information specifying characteristics of voice), the speech recognition server device 900 performs speech recognition, and transmits a word thus recognized in the form of character string. It is to be noted that since the word thus recognized usually includes ambiguity, the recognition is performed under the condition of permitting ambiguity, such as N-best search method. Depending on the accuracy in recognition, one or more than one possible character string is transmitted.

In addition, the POI provision server device 950 is a device for implementing a service for searching for a POI (Point Of Interest) provided by a predetermined carrier, or the like, via the network 30. In the present embodiment, upon receipt of the character string thus transmitted, the POI provision server device 950 searches for and identifies the POI which corresponds to the character string, i.e., one or more than one POI including the character string or an analogous character string, and transmits a POI list depending on the probability of the correspondence. It is to be noted that in the POI list, each character string being transmitted is associated with one or more POIs, in descending order of accuracy from highest to the lowest, and each POI includes, a name of the POI, coordinate information such as latitude and longitude for identifying the location of the POI, an address of the POI, and a phone number as to the POI.

The navigation device 100 is a type of navigation system, which is capable of displaying map information and showing information for guiding along a route from a point indicating the current position of the navigation device 100 to a destination being set.

Upon receipt of the request to search for the POI and the speech information from the navigation device 100, the relay server device 500 removes noise from the speech information, transmits the speech information to the speech recognition server device 900, transmits the character string transmitted from the speech recognition server device 900 to the POI provision server device 950, and transmits the POI list being received to the navigation device 100.

Here, further explanations will be made in detail as to the configuration of the relay server device 500. The relay server device 500 is provided with a storage 510, a controller 520, and a transmitter-receiver 530. The storage 510 includes a server information table 511, and this table stores setting information which identifies the speech recognition server device 900 for recognizing the speech and the POI provision server device 950 for providing the POI.

The controller 520 includes a noise removal processor 521 and a POI provider 522. The noise removal processor 521 uses one or more noise removal algorithms and removes noise from the speech information received from the navigation device 100, according to each algorithm. In other words, if it is assumed that the noise removal processor 521 is able to execute four types of noise removal algorithm, for example, the noise removal processor applies each of the algorithms to the speech information received from the navigation device 100, and outputs four types of speech information from which the noise has been removed. It is to be noted that such algorithms as described above may include an algorithm which removes noise according to adaptive filtering, a spectral subtraction for removing noise spectrum from a frequency domain, a running spectrum filter that allows a digital filter to pass through a short-time spectrum (running spectrum) which changes temporally in the frequency domain, with respect to each frequency in the temporal axis direction.

The POI provider 522 accepts the speech information from the navigation device 100, allows the noise removal processor 521 to remove noise therefrom, and transmits one or more speech information items from which the noise has been removed to the speech recognition server device 900, based on the setting information stored in the server information table 511. Then, upon receipt of one or more recognized character strings transmitted from the speech recognition server device 900, the POI provider 522 transmits thus received recognized character strings to the navigation device 100. Upon accepting a character string selected from a user of the navigation device 100, the POI provider transmits a POI search request including the character string, to the POI provision server device 950. Then, the POI provider 522 transmits the POI list transmitted from the POI provision server device 950 to the navigation device 100.

The transmitter-receiver 530 transmits information to other devices, and receives information from other devices, via the network 30. In the present embodiment, the transmitter-receiver 530 establishes communication among the navigation device 100, the speech recognition server device 900, and the POI provision server device 950.

Figure 2:
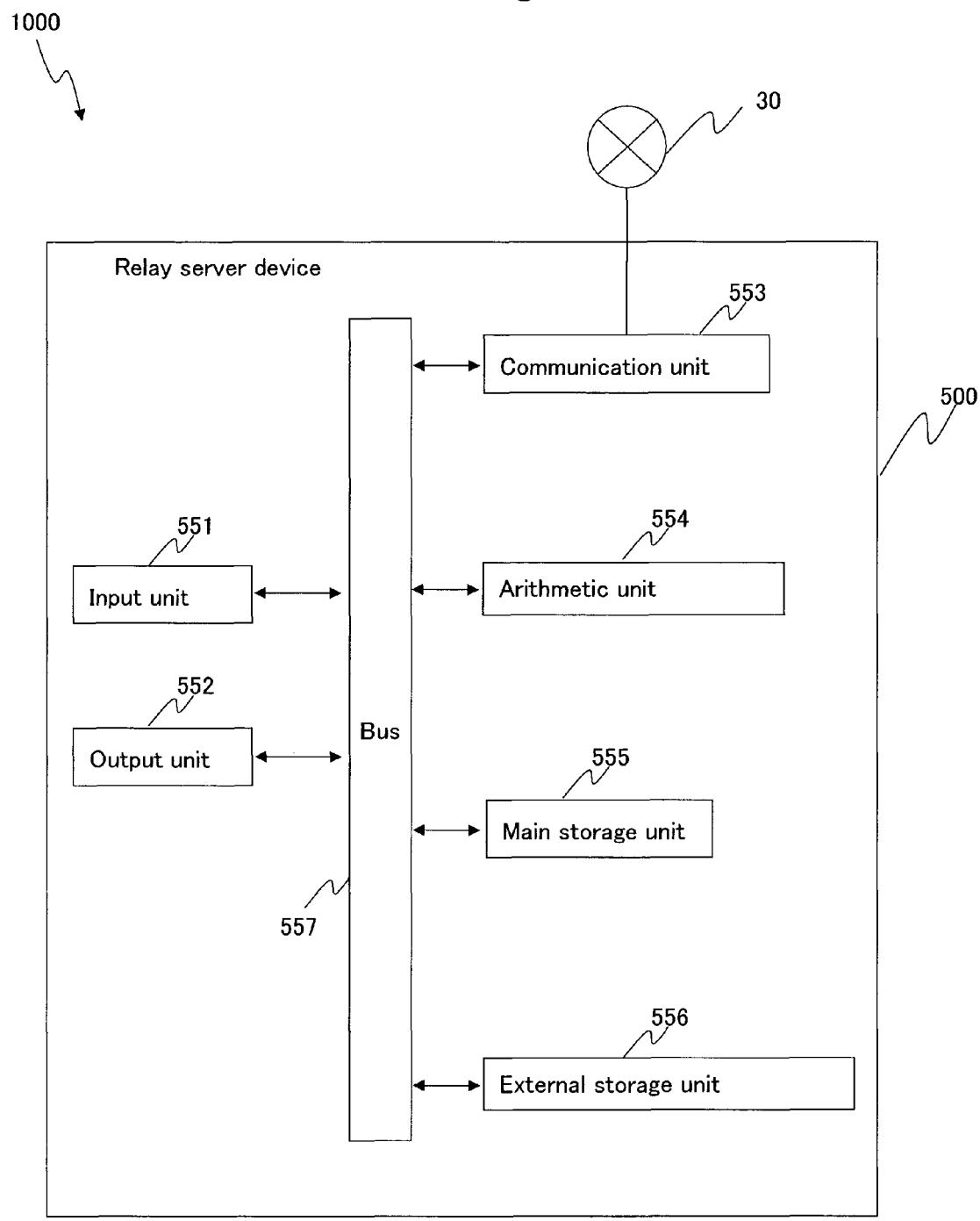
FIG. 2 is a hardware block diagram showing a relay server device.

FIG. 2 is a hardware block diagram of the relay server device 500. The relay server device 500 incorporates an input unit 551, an output unit 552, a communication unit 553, an arithmetic unit 554, a main storage unit 555, and an external storage unit 556. Each of the units is connected via a bus 557. It is to be noted that the input unit 551 and the output unit 552 are not absolutely necessary elements, but they may be provided as appropriate.

The input unit 551 is a unit for accepting inputs from a keyboard, a mouse, a touch pen, a pointing device, or the like. The output unit 552 is a unit for creating a display, or the like. The communication unit 553 is a unit for establishing communication with other devices via a network, such as the network 30. The communication unit 553 of the relay server device 500 is able to establish communication via the network 30, among the speech recognition server device 900, the POI provision server device 950, and the communication unit 12 of the navigation device 100, and the like. The arithmetic unit 554 may be a CPU (Central Processing Unit), for example. The main storage unit 555 may be a memory unit such as RAM (Random Access Memory). The external storage unit 556 may be a non-volatile storage unit such as a hard disk unit and SSD (Solid State Drive).

It is to be noted that an operation code expanded in the main storage unit 555 may be stored in the external storage unit 556, or it may be acquired via the communication unit 553, from other device not illustrated, on the network 30, or from a device on the network such as the Internet. The main storage unit 555 has a region for expanding the operation code that is executed by the arithmetic unit 554. The external storage unit 556 is a standard storage unit usually employed, and stores in advance, software for activating the relay server device 500, initial values of data required by the software, other data, and the like.

The arithmetic unit 554 reads in and executes predetermined programs, thereby constructing the noise removal processor 521 and the POI provider 522 of the controller 520 in the relay server device 500. Therefore, the main storage unit 555 stores programs for implementing the process of each functional parts.

It is to be noted that the constitutional elements of the aforementioned relay server device 500 are categorized according to the processing details, so as to facilitate understanding of the configuration thereof. Therefore, how the constitutional elements are categorized or the names thereof may not restrict the scope of the present invention. The configuration of the relay server device 500 may be categorized into more various constitutional elements according to the processing details. It is alternatively possible to categorize the elements in such a manner that one constitutional element executes more various processing.

In addition, the controller 520 of the relay server device 500 may be structured by hardware (ASIC, GPU, or the like). Furthermore, the processing of each constitutional element may be executed by a piece of hardware, or by more than one piece of hardware.

Figure 3:
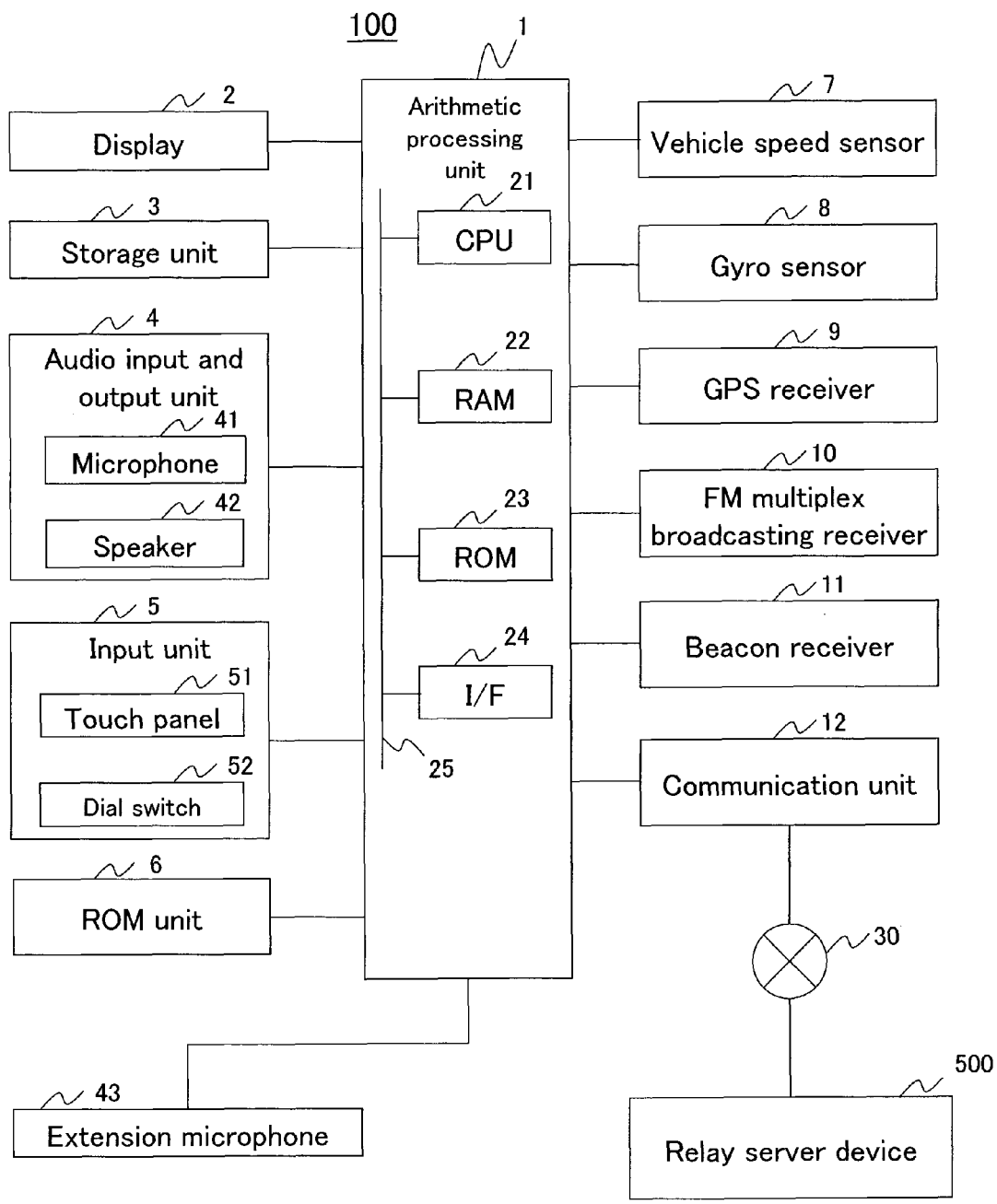
FIG. 3 is a schematic block diagram showing a navigation device.

FIG. 3 is an overall block diagram showing the navigation device 100. The navigation device 100 incorporates an arithmetic processing unit 1, a display 2, a storage unit 3, an audio input and output unit 4 (a microphone 41 as an audio input unit, and a speaker 42 as an audio output unit), an input unit 5, an ROM unit 6, a vehicle speed sensor 7, a gyro sensor 8, a GPS (Global Positioning System) receiver 9, an FM multiplex broadcasting receiver 10, a beacon receiver 11, and a communication unit 12.

The arithmetic processing unit 1 is a central unit for performing various processing. By way of example, the arithmetic processing unit calculates a current position on the basis of the information outputted from various sensors 7 and 8, the GPS receiver 9, the FM multiplex broadcasting receiver 10, and the like. According to the current position information being obtained, the arithmetic processing unit reads out map data necessary for creating a display, from the storage unit 3 or the ROM unit 6.

The arithmetic processing unit 1 graphically expands the map data being read out, and displays the data on the display 2 in such a manner as superimposing thereon a mark indicating the current position. The arithmetic processing unit 1 uses the map data or the like stored in the storage unit 3 or in the ROM unit 6 to search for an optimum route (a recommended route) connecting a departure place or the current position with a destination (a via point or a stop-off point). The arithmetic processing unit 1 further uses the speaker 42 and the display 2 to guide the user.

The arithmetic processing unit 1 in the navigation device 100 has a configuration that each device element is connected via a bus 25. The arithmetic processing unit 1 is made up of a CPU (Central Processing Unit) 21 for executing various processing such as performing numerical processing and controlling each device element, RAM (Random Access Memory) 22 for storing mad data, operation data, and the like, being read from the storage unit 3, ROM (Read Only Memory) 23 for storing programs and data, and an I/F (interface) 24 for establishing connection between various hardware and the arithmetic processing unit 1.

The display 2 is a unit for displaying graphics information generated by the arithmetic processing unit 1, and the like. The display 2 is made up of a liquid crystal display or an organic EL (Electro-Luminescence) display, for instance.

The storage unit 3 is made up of a storage medium at least readable and writable, including HDD (Hard Disk Drive) and a non-volatile memory card.

The storage medium stores a link table 200 being map data (including link data of the links constituting the roads on the map) which is necessary for a usual route searching device.

Figure 4:
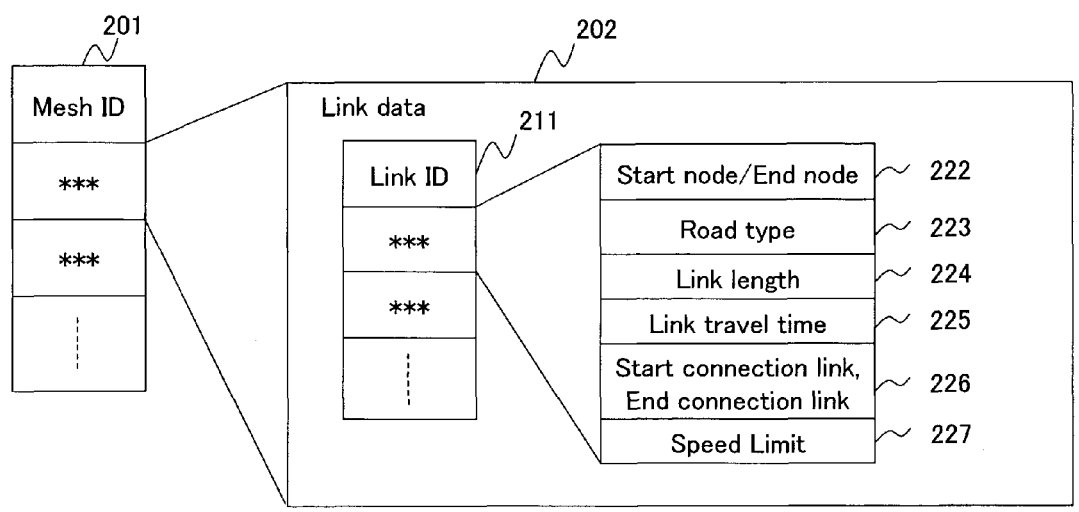
FIG. 4 illustrates a configuration of a link table.

FIG. 4 illustrates a configuration of the link table 200. The link table 200 includes link data 202 with respect to each identification code (mesh ID) 201 indicating a mesh being a region partitioned on the map, the link data representing each link constituting a road included in the mesh region.

The link data 202 includes with respect to each link identification code (link ID) 221, coordinate information 222 of two nodes (a start node and an end node) constituting the link, a road type information 223 indicating a type of the road including the link, a link length 224 indicating a length of the link, a link travel time 225 stored in advance, a start connection link and an end connection link 226, respectively specifying a start connection link being a link connected to a start node of the link, and an end connection link being a link connected to an end node of the link, and a speed limit 227 representing a speed limit of the road including the link, and the like.

It is to be noted here that there is a distinction between the start node and the end node being the two nodes constituting a link, thereby allowing up-line and down-line of the same road to be managed as links different from each other.

Here, an explanation will be made, referring to FIG. 3 again. The audio input and output unit 4 is provided with the built-in microphone 41 as an audio input unit, and the speaker 42 as an audio output unit. The microphone 41 captures audio data from the outside of the navigation device 100, such as voice of a user and other passengers.

The audio input and output unit 4 is further provided with a connection part for connecting an extension microphone 43. In other words, the audio input and output unit 4 is allowed to accept connection of the extension microphone 43 such as a headset showing higher performance in collecting sound, in general, and therefore it is possible to accept speech information at a higher degree of precision.

The speaker 42 outputs a message to the user in the form of voice, generated by the arithmetic processing unit 1. The microphone 41 and the speaker 42 are separately mounted on predetermined portions of a vehicle. It is to be noted that one enclosure may accommodate these elements in an integrated manner. The navigation device 100 may be provided with multiple microphones 41 and multiple speakers 42.

The input unit 5 is a unit for accepting a directive from the user, via manipulation by the user. The input unit 5 is made up of a touch panel 51, a dial switch 52, and other hard switches (not illustrated) such as a scroll key and a scaling key. The input unit 5 further includes a remote controller that is capable of giving operating instruction remotely to the navigation device 100. The remote controller is provided with a dial switch, a scroll key, a scaling key, and the like, allowing information obtained by operating each of the keys and switches to be transmitted to the navigation device 100.

The touch panel 51 is attached on a display surface of the display 2, and it is transparent to see the display surface. The touch panel 51 is used to specify a touch position in association with XY coordinates of the image displayed on the display 2, convert the touch position to coordinates, and output the coordinates. The touch panel 51 is made up of pressure-sensitive type or electrostatic type input detecting elements, or the like.

The dial switch 52 is constructed in rotatable manner, both in the clockwise direction and in the anti-clockwise direction, issues a pulse signal according to a rotation by a predetermined angle, and outputs the pulse signal to the arithmetic processing unit 1. The arithmetic processing unit 1 obtains a rotation angle of the dial switch 52 based on the number of the pulse signals.

The ROM unit 6 is made up of a storage medium at least readable, such as ROM (Read Only Memory) including a CD-ROM, a DVD-ROM, and the like, and an IC (Integrated Circuit) card. Byway of example, this storage medium stores video data, audio data, and the like.

The navigation device 100 uses the vehicle speed sensor 7, the gyro sensor 8, and the GPS receiver 9 so as to detect a current position (a location of own vehicle). The vehicle speed sensor 7 is a sensor for outputting a value that is used to calculate a vehicle speed. The gyro sensor 8 is made up of an optical fiber gyroscope, a vibrating gyroscope, or the like, to detect an angular rate according to rotation of the moving object. The GPS receiver 9 receives a signal from a GPS satellite, measures a distance between the moving object and the GPS satellite and a rate of change of the distance, with respect to at least three satellites, thereby obtaining the current position, a traveling speed, and a traveling azimuth of the moving object.

The FM multiplex broadcasting receiver 10 receives an FM multiplex broadcasting signal that is transmitted from an FM broadcasting station. The FM multiplex broadcasting information includes brief current traffic information, information on restrictions, SA/PA (service area/parking area) information, parking lot information, weather information, and the like, according to the VICS (Vehicle Information Communication System: registered trademark), and character information provided by a radio station as FM multiplex general information, and the like.

The beacon receiver 11 receives brief current traffic information, information on restrictions, SA/PA (service area/parking area) information, parking lot information, weather information, an emergency alert, and the like, obtained as VICS information or the like. By way of example, it is a receiver to receive an optical beacon for optical communication, a radio beacon for radio communication, or the like.

The communication unit 12 is a unit for allowing the navigation device 100 to be connected to the network 30, and the like, and establishing communication with other device such as the relay server device 500 being connected to the network. It is to be noted that the communication unit 12 may be built in the navigation device 100, or may be attachable as an external device, such as a communication module using a cell phone network and a cell phone. Information is exchanged between the navigation device 100 and the communication unit 12, according to a predetermined communication protocol such as USB (Universal Serial Bus) and Bluetooth (registered trademark).

Figure 5:
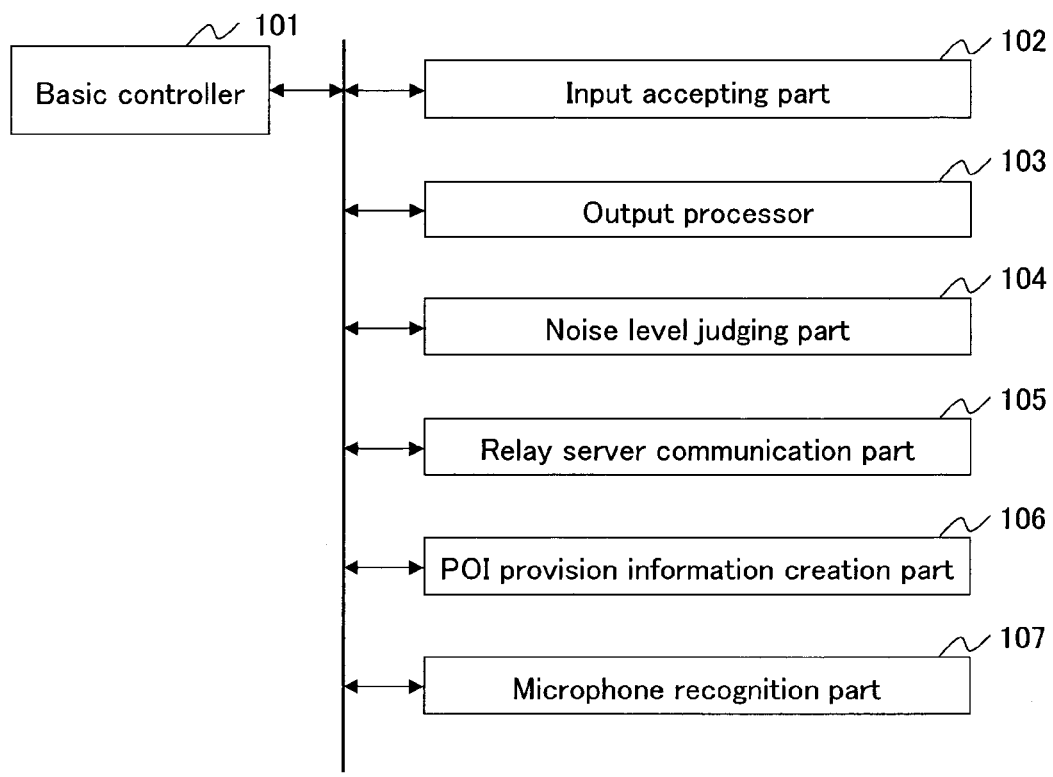
FIG. 5 is a functional block diagram showing an arithmetic processing unit.

FIG. 5 is a functional block diagram of the arithmetic processing unit 1. As illustrated, the arithmetic processing unit 1 incorporates a basic controller 101, an input accepting part 102, an output processor 103, a noise level judging part 104, a relay server communication part 105, a POI provision information creation part 106, and a microphone recognition part 107.

The basic controller 101 is a primary functional part for performing various processing, and controls other processors depending on processing details. The basic controller further acquires information from various sensors, the GPS receiver 9, and the like, and performs map matching to specify the current position. In addition, the basic controller stores travel history in the storage unit 3, as needed, with respect to each link, the information being the date and time when traveled and the location, establishing association therebetween. In response to a request from each processor, the basic controller outputs the current time.

The input accepting part 102 accepts an instruction from the user, inputted via the input unit 5 or via the microphone 41, and controls each part of the arithmetic processing unit 1 so as to execute the processing associated with the requested details. By way of example, when the user requests a search for a recommended route, the input accepting part requests the output processor 103 to display the map on the display 2 so as to allow the setting of a destination.

The output processor 103 receives screen information to be displayed, such as polygon information, for instance, and gives a directive to convert the screen information to signals for drawing on the display 2, thereby making a drawing on the display 2.

The noise level judging part 104 determines a noise level on the speech information inputted from the microphone 41 of the audio input and output unit 4 or the extension microphone 43. Specifically, the noise level judging part 104 extracts noise components included in a waveform of a predetermined silent portion in the speech information being accepted, preferably the noise components included in a waveform of the silent portion corresponding to initial 100 ms in the speech information, and determines whether or not the noise level is equal to or higher than a predetermined level, according to the size of the noise amount.

The relay server communication part 105 transmits the inputted speech information to the relay server device 500. The relay server communication part 105 further receives a character string obtained as a result of the speech recognition, from the relay server device 500. In addition, the relay server communication part 105 transmits the POI information being selected, to the relay server device 500, and receives POI list information.

The POI provision information creation part 106 integrates the POI list information being received, to create screen information, and the like, to be presented to the user, in such a manner as selectable as a POI list, and requests the output processor 103 to output thus created screen information.

The microphone recognition part 107 recognizes the microphone connected to the navigation device 100. Specifically, the microphone recognition part 107 detects that the extension microphone 43 is connected, and specifies a microphone to be used, in response to the selection by the user as to which microphone is used, the built-in microphone 41 or the extension microphone 43.

The CPU 21 reads and executes predetermined programs, thereby establishing each of the aforementioned functional parts of the arithmetic processing unit 1; i.e., the basic controller 101, the input accepting part 102, the output processor 103, the noise level judging part 104, the relay server communication part 105, the POI provision information creation part 106, and the microphone recognition part 107. Therefore, the RAM 22 stores the programs to implement the processing of each of the functional parts.

It is to be noted that the constitutional elements described above are categorized according to the processing details, so as to facilitate understanding of the configuration of the navigation device 100. Therefore, the way how the constitutional elements are categorized or the names thereof may not restrict the scope of the present invention. The configuration of the navigation device 100 may be categorized into more various constitutional elements according to the processing details. It is alternatively possible to categorize the elements in such a manner that one constitutional element executes more various processing.

In addition, each functional part may be constructed by hardware (ASIC, GPU, or the like). Furthermore, the processing of each functional part may be executed by a piece of hardware, or by more than one piece of hardware.

[Description of the Operation]

Figure 6:
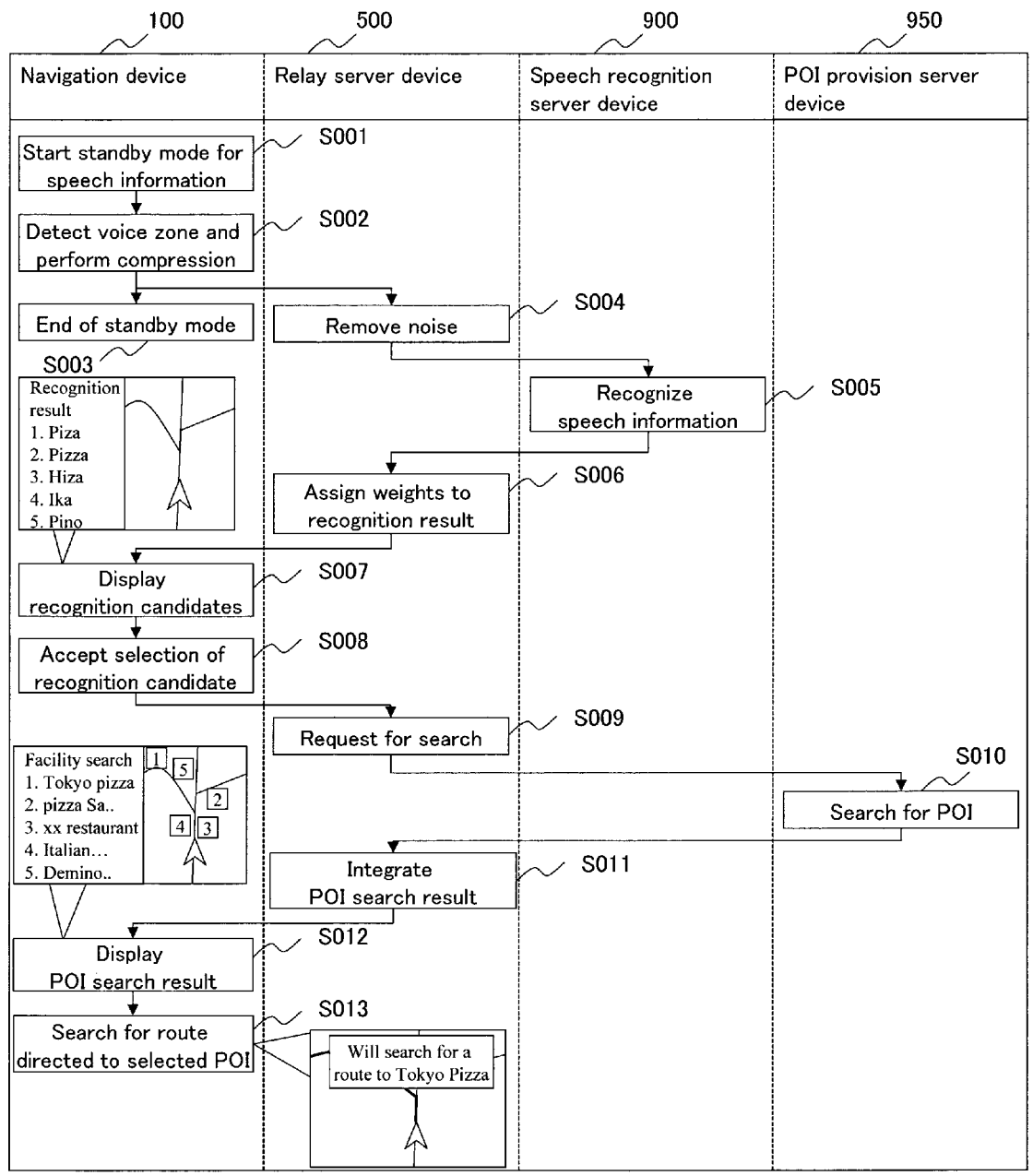
FIG. 6 illustrates a flow of an information searching process.

Next, an explanation will be made as to the operation of a POI searching process conducted in the searching system 1000 including the navigation device 100, the relay server device 500, the speech recognition server device 900, and the POI provision server device 950. FIG. 6 is a flow diagram showing the POI searching process. This flow starts upon accepting an instruction to start inputting speech information via a predetermined PTT (Push To Talk) button, or the like, while the navigation device 100 is activated.

Firstly, the input accepting part 102 starts a stand-by mode waiting for inputting of speech information (step S001). Then, the input accepting part 102 continues detecting a voice zone, until the stand-by mode waiting for inputting the speech information is finished by releasing the PTT button, or the like, and compresses the inputted speech information, thereby creating the speech information being compressed (step S002). Here, the noise level judging part 104 determines the noise level of the inputted speech information. Then, if the noise level is higher than a predetermined level, in other words, in a noisy circumstance, it is possible that the input accepting part 102 performs the compression, with the setting of a lower compression rate, thereby keeping sound-quality deterioration caused by the compression to be the minimum. If the noise level is much higher and exceeds a predetermined threshold, in other words, it is an extremely noisy circumstance and far from performing the speech recognition normally, the input accepting part 102 may be configured such that it neither creates the speech information nor conducting the subsequent processing.

The input accepting part 102 transmits the speech information to the relay server device 500 via the relay server communication part 105. Then, the noise removal processor 521 of the relay server device 500 subjects the speech information being received to a noise removal process which implements a predetermined algorithm (step S004). Specifically, the noise removal processor 521 performs the noise removal process on the speech information being received, according to one or more algorithms which are defined to be applied when the noise removal process is performed, and creates one of more speech information items from which the noise has been removed.

Then, the POI provider 522 transmits one or more speech information items from which the noise has been removed, to the speech recognition server device 900. Then, the speech recognition server device 900 transmits to the relay server device 500, one or more information items being character string candidates as a result of recognition, obtained by subjecting each speech information item to a predetermined speech recognition process (step S005). It is to be noted that in this speech recognition process, processing such as already-existing speech recognition is carried out, and one or more character string candidates as a result of the recognition are outputted according to N-best search, or the like, together with their degree of accuracy. By way of example, when the speech information outputted from the user corresponds to "pizza", the character string candidates; "pita", "pizza", "hiza", "ika", and the like, are outputted for each speech information.

Then, upon receipt of the character string information outputted as the recognition result, the POI provider 522 assigns weights to the recognition result (step S006). Specifically, the character string information as the recognition result being outputted includes one or more candidates depending on the noise removal algorithms. If there are included any redundant candidates, they are integrated to one, and the integrated candidate is corrected to have a higher degree of accuracy (e.g., a predetermined ratio of accuracy is added thereto). Then, the character string candidates are ranked in descending order of accuracy. It is further possible that in the weighing process, the POI provider 522 may assign weights depending on the noise removal algorithm applied to the speech information. In other words, the speech information to which a suitable noise removal algorithm has been applied may be considered as having a high degree of recognition precision, and thus, it is possible to give greater importance to such candidate which is considered as having the high recognition precision. In addition, if there is any candidate related to a POI with a high possibility of not corresponding to a facility, this candidate may be removed.

The POI provider 522 transmits the character string candidates being ranked, to the navigation device 100. Then, the POI provision information creation part 106 of the navigation device 100 creates screen information in which thus received character string candidates being ranked as the recognition result are outputted in the form of a list in selectable manner, and instructs the output processor 103 to display the screen information on the display 2 (step S007). It is to be noted here that if the number of the character string candidates being ranked does not satisfy a predetermined number, or the noise level included in the speech information accepted in the step S002 is lower than a predetermined level, i.e., in the case where the speech recognition result includes little ambiguity, it is possible to skip the process in the step S008 described below, and performs the process in the step S009 which transmits a request to search for a POI.

Then, the input accepting part 102 accepts an input for selecting the candidate designated by the user on the displayed screen, and transmits the input to the relay server device 500 via the relay server communication part 105 (step S008).

The POI provider 522 transfers thus transmitted character string being the candidate to the POI provision server device 950 and sends a request to search for the POI (S009).

The POI provision server device 950 conducts a fluctuation search for the POI which includes the transmitted character string being the candidate, in its facility name or in its address or the like, or includes a character string similar to the transmitted character string being the candidate, in its facility name or in its address or the like, retrieves multiple POI candidates organized by accuracy, and then transmits to the relay server device 500, a POI list including the name, coordinate, phone number, address, and the like, of the POI (step S010).

The POI provider 522 subjects the transmitted POI list to the POI search result integration process described below, and integrates the list (step S011) Then, the POI provider 522 transmits thus integrated POI search result to the navigation device 100.

The POI provision information creation part 106 uses the POI search result being received, creates a display screen showing each POI in selectable manner, and instructs the output processor 103 to display the POI on the display 2 (step S012). By way of example, the POI provision information creation part 106 displays a list of the restaurants providing pizza food, or the like, in a selectable manner, when the selected candidate is "pizza", and creates a screen which displays an icon of each restaurant at a corresponding position in association with the coordinate position of the restaurant.

Then, the basic controller 101 accepts via the input accepting part 102, a selection of the POI being displayed, and performs a route search assuming the selected POI as a destination or a via point (step S013). Upon searching for the route, the basic controller 101 displays a route searching message including the name of the POI being selected. By way of example, when the name of the POI being selected is "Tokyo pizza", the basic controller 101 displays a message, "Will search for a route to the Tokyo pizza", and conducts the route search for the route directed to the POI.

The flow of the POI searching process has been described so far. According to the POI searching process, it is possible to use a higher-level searching function, more easily. Specifically, it is possible to say that even though a processing ability of the navigation device is not particularly high, speech recognition with a high degree of precision and a sophisticated POI searching function are available.

Figure 7:
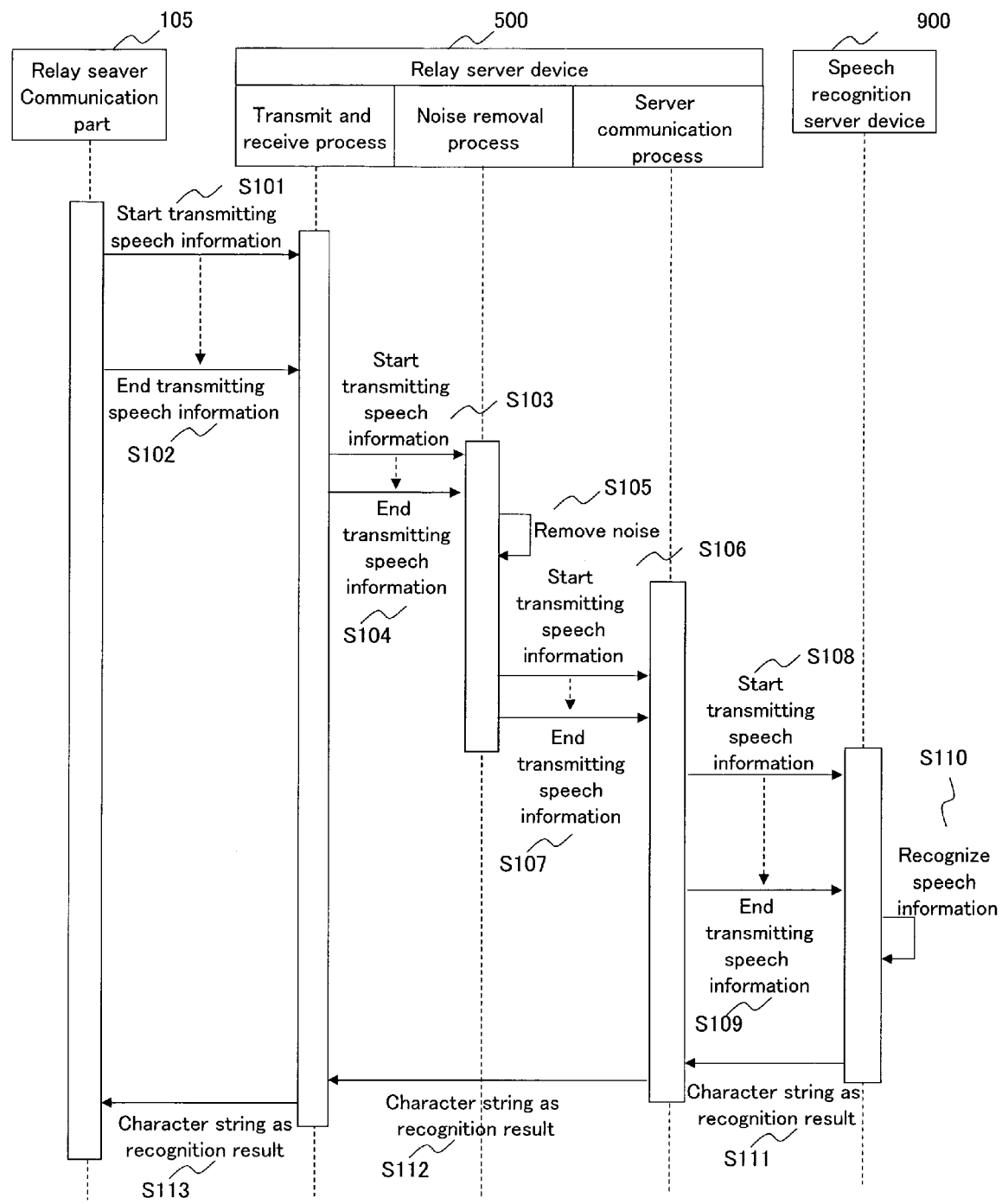
FIG. 7 is a sequence diagram in the information searching process.

FIG. 7 is a sequence diagram showing relevancy among the processes in the steps S002 to S007 in the POI searching process as shown in FIG. 6.

Firstly, the relay server communication part 105 of the navigation device 100 starts transmission of the speech information to a transmit and receive process (controlled by the POI provider 522) of the relay server device 500 (step S101).

Then, the relay server communication part 105 continues the transmission of the speech information until the transmission of the entire speech information is completed (step S102).

Only after the completion of the transmission of the speech information from the relay server communication part 105, the transmit and receive process of the relay server device 500 starts transmission of the speech information to the noise removal process controlled by the noise removal processor 521 (step S103). Then, upon completion of the transmission of the entire speech information, the transmission of the speech information to the noise removal process is completed in the transmit and receive process of the relay server device 500 (step S104).

In the noise removal process, the noise removal processor 521 subjects the speech information being transmitted to a predetermined noise removal process (step S105). The noise removal processor 521 of the relay server device 500 starts transmission of the speech information from which the noise has been removed, to the server communication process that is controlled by the POI provider 522 (step S106). Then, upon the completion of the transmission of the speech information from which the noise has been removed, the transmission of the speech information to the server communication process is completed, in the noise removal process of the relay server device 500 (step S107).

After receipt of the entire speech information from which the noise has been removed, the POI provider 522 starts in the server communication process, transmission of the speech information from which the noise has been removed, being transmitted from the noise removal process, to the speech recognition server device 900 (step S108). It is to be noted here that if the speech information items exist respectively for various noise removal algorithms, all of the multiple speech information items are transmitted.

Then, after the completion of the transmission of the speech information from which the noise has been removed, the transmission of the speech information to the speech recognition server device 900 is completed in the server communication process of the relay server device 500 (step S109).

Then, the speech recognition server device 900 subjects the received speech information from which the noise has been removed, to a predetermined speech recognition process, and specifies one or more character string candidates obtained as a result of the recognition, according to the N-best search (step S110).

In the server communication process of the relay server device 500, the POI provider 522 receives all the character string candidates, transmitted from the speech recognition server device 900 (step S111).

In the server communication process of the relay server device 500, the POI provider 522 transmits all the received character strings to the transmit and receive process (step S112).

In the transmit and receive process of the relay server device 500, the POI provider 522 transmits the character string as the result of the recognition to the relay server communication part 105 of the navigation device 100 (step S113).

There has been described so far, the relevancy among the processes in the step S002 to the step S007 of the POI searching process as shown in FIG. 6. It is to be noted that detailed explanations as to the processes such as removing the noise (step S004) and assigning weights on the recognition result (step S006) are skipped in the description of the relevancy among the processes.

Figure 8:
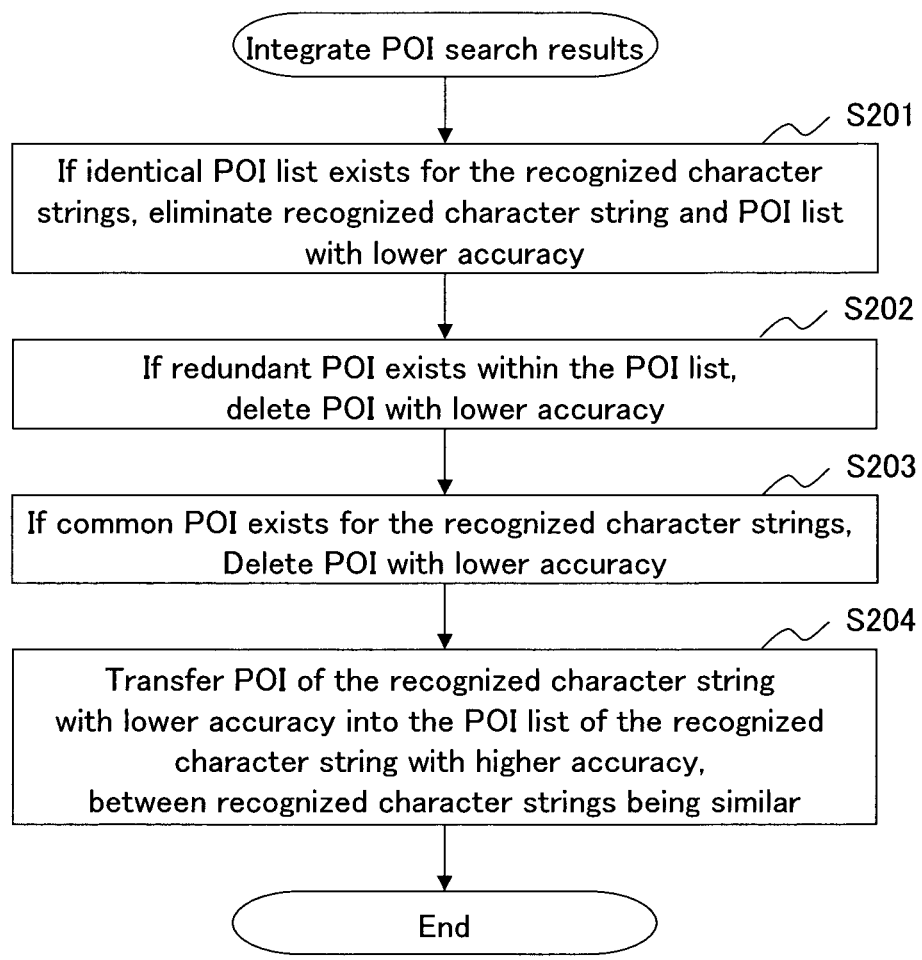
FIG. 8 is a flow diagram of a POI search result integration process.

FIG. 8 is a diagram showing a flow of the POI search result integration process. The relay server device 500 performs the POI search result integration process, in the step S011 of the POI searching process as shown in FIG. 6.

Firstly, if there are any POI lists being identical between the recognized character strings, the POI provider 522 deletes the recognized character string with a lower degree of accuracy and the POI list thereof (step S201). Specifically, the POI provider 522 compares the POI lists with each other, as to one or more recognized character strings, their accuracy and associated POI lists, being received from the POI provision server device 950, and when there are any POI lists each including constituent POIs being in perfect agreement with each other, the POI provider 522 deletes a POI list for the recognized character string with a low degree of accuracy, together with the information of the recognized character string and the degree of accuracy. Then, this process is repeated until there is no more redundancy among all the POI lists.

Then, in the case where there is a redundant POI within the POI list, the POI provider 522 deletes the POI with a lower degree of accuracy from the list (step S202). Here, it is assumed that the POI list includes both the information of the POI and the information as to the degree of accuracy of the POI which is associated with the recognized character string. In the case where more than one POI having the same POI name is included in the POI list associated with one recognized character string, the POI provider 522 deletes the POI with a lower degree of accuracy from the POI list and eliminates the redundancy.

Then, if there is a POI which is common among the recognized character strings, the POI provider 522 deletes the POI for the recognized character string with a low degree of accuracy (step S203). Specifically, the POI provider 522 compares the POI lists among the recognized character strings, the POI lists respectively being associated with the recognized character strings, and if there are included POIs having the same POI name in both of the POI lists, the POI provider 522 deletes from the POI list, the POI included in the POI list associated with the recognized character string with a lower degree of accuracy and eliminates the redundancy.

Next, the POI provider 522 transfers the POI of the recognized character string with a lower degree of accuracy, to the POI list of the recognized character string with a higher degree of accuracy, between the recognized character strings similar to each other (step S204). Specifically, the POI provider 522 specifies a combination of the recognized character strings, in which a similarity degree of the character strings becomes equal to or higher than a predetermined degree, and in this combination, transfers the POI information included in the POI list associated with the recognized character string with a low degree of accuracy, as a low ranked POI in the POI list which is associated with the recognized character string with a high degree of accuracy, thereby obtaining an integrated POI list.

A flow of the POI search result integration process has been described so far. According to the POI search result integration process, it is possible to obtain an integrated POI list from the lists being retrieved respectively based on the search strings in the relationship being similar to each other, and it is further possible to obtain the POI list from which redundancy has been removed.

Figure 9:
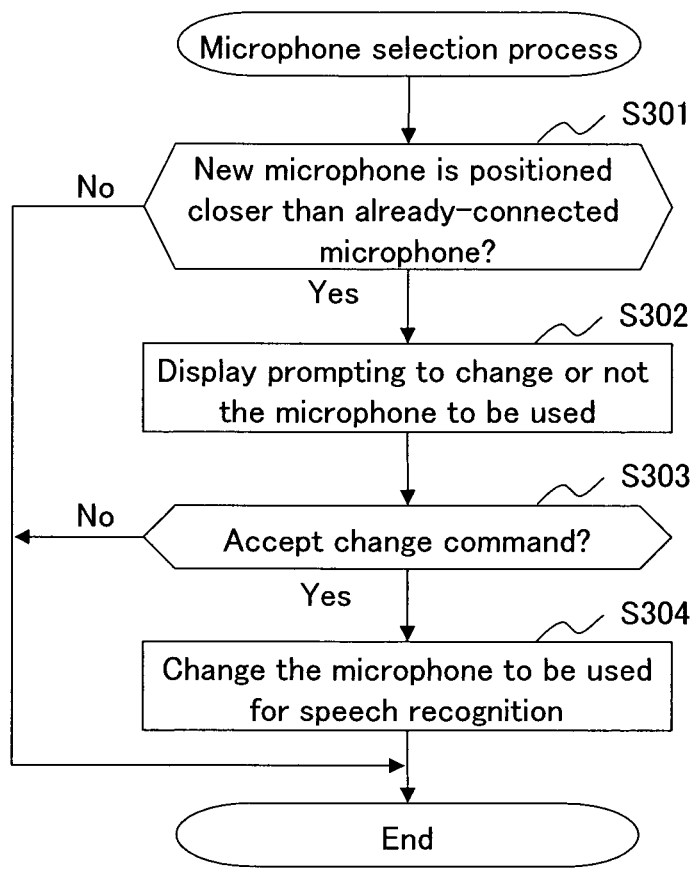
FIG. 9 is a flow diagram of a microphone selection process.

FIG. 9 is a processing flow of a microphone selection process that is performed in the navigation device 100. The microphone selection process is performed when the basic controller 101, or the like, newly detects a connection of the extension microphone in the navigation device 100.

Firstly, the microphone recognition part 107 determines whether or not the newly connected microphone (hereinafter, referred to as a new microphone) is positioned closer than the already-connected microphone (step S301). Specifically, if the new microphone is a headset microphone assumed as located in proximity to the mouth of a speaker, the microphone recognition part 107 determines that this new microphone is the "closest". If the new microphone is an external microphone, it is determined that the new microphone is positioned "closer" than the built-in microphone 41. However, it is to be noted that if the headset microphone is already connected and the new microphone is the external microphone, the microphone recognition part 107 determines that the new microphone is not positioned "closer".

If the new microphone is not positioned closer than the already connected microphone ("No" in the step S301), the microphone recognition part 107 ends the microphone selection process.

If the new microphone is positioned closer than the already connected microphone ("Yes" in the step S301), the microphone recognition part 107 makes a display prompting to change or not the microphone to be used (step S302). Specifically, the microphone recognition part 107 instructs the output processor 103 to output a message "Do you want to set the new microphone for ordinary use?" and a dialog box or the like, for accepting a change command as a response to the message, such as Yes or No.

Upon accepting the change command such as Yes or No being the response to the displayed prompt, the microphone recognition part 107 determines whether or not the instruction being accepted is a positive response (step S303). If it is not the positive response, the microphone recognition part 107 ends the microphone selection process.

Upon accepting the positive response ("Yes" in the step S303), the microphone recognition part 107 changes the microphone used for the speech recognition to the new microphone (step S304). Specifically, the microphone recognition part 107 configures the setting of the microphone for accepting the input in the speech recognition process, in such a manner as establishing association with the new microphone.

The flow of the microphone selection process has been described so far. According to the microphone selection process, when a new microphone is recognized and this new microphone is positioned closer than the already-connected microphone, it is possible to set whether or not the microphone is used for recognizing the speech, in response to the instruction from the user. It is to be noted that in the microphone selection process, if there is a microphone which the user has designated in advance, it is possible to set this microphone to be used on a priority basis.

It is to be noted that the microphone recognized as a new microphone in the microphone selection process may not be limited only to a headset, or the like, but it may be any device which is able to accept audio input, for example, such as a microphone connected to a cell phone via the Bluetooth (registered trademark), and a microphone establishing communication with the navigation device 100 via an FM transmitter.

Next, with reference to FIG. 10, an explanation will be made as to the microphone utterance selection process conducted by the microphone recognition part 107 when the user utters. In the case where accepting of inputs from multiple microphones is possible, the microphone utterance selection process selectively employs an input from the microphone which is good in sound quality, to maintain the input to have a high audio quality.

Firstly, the basic controller 101 accepts speech information via all the microphones being inputted (step S401). Here, it is not necessarily all the microphones that accept the speech information, but multiple microphones being designated in advance or a predetermined number of microphones selected in descending order of gains may accept the speech information.

Next, the microphone recognition part 107 specifies a noise level with respect to each microphone, and employs the speech information that is accepted by the microphone with a low noise level (step S402). Specifically, the microphone recognition part 107 specifies the noise level (S/N ratio), as to the speech information inputted from each microphone, via the noise level judging part 104, and employs the speech information with the lowest noise ratio, being identified as the inputted speech information.

The processing flow of the microphone utterance selection process has been explained so far. According to the microphone utterance selection process, it is possible to employ the speech information with a high sound quality, out of the speech information actually uttered. Therefore, in the case where the acoustic environment varies continually, such as inside the vehicle, audio input with the highest sound quality can be achieved for each utterance.

The first embodiment of the present invention has been explained so far. According to the first embodiment of the present invention, it is possible for the navigation device 100 to utilize a higher level searching function, more easily and simply. It is to be noted that in the microphone utterance selection process, if there is a microphone which the user has designated in advance, it is possible to employ this microphone on a priority basis.

The present invention is not limited to the aforementioned embodiment. The embodiment as described above may be variously modified within the scope of the technical idea of the present invention. By way of example, as shown in FIG. 11, the flow of the POI searching process may be modified as a second embodiment where the POI search is conducted without waiting for an instruction from the user, as to the character string as a result of the speech recognition.

An explanation will be made as to the second embodiment. In the second embodiment, basically, the searching system has a configuration approximately the same as the first embodiment, and there is a difference in the POI searching process. An explanation will be made focusing on this difference.

Firstly, the input accepting part 102 starts a standby mode waiting for inputting of speech information (step S501). Then, the input accepting part 102 continues detecting a voice zone, until the stand-by mode waiting for the speech information is finished by releasing the PTT button, or the like, and compresses the inputted speech information to create speech information being compressed (step S502). Here, the noise level judging part 104 determines the noise level of the inputted speech information. Then, when the noise level is higher than a predetermined level, in other words, in a noisy circumstance, it is possible that the input accepting part 102 performs the compression, with the setting of a lower compression rate, thereby keeping sound-quality deterioration caused by the compression to be the minimum. When the noise level becomes higher and exceeds a predetermined threshold, in other words, it is an extremely noisy circumstance and far from performing the speech recognition normally, the input accepting part 102 may be configured such that it neither creates the speech information nor conducting the subsequent processing.

The input accepting part 102 transmits the speech information to the relay server device 500 via the relay server communication part 105. Then, the noise removal processor 521 of the relay server device 500 subjects the speech information being received to the noise removal process which implements a predetermined algorithm (step S504). Specifically, the noise removal processor 521 performs the noise removal process on the speech information being received, according to one or more algorithms which are defined to be applied when the noise removal process is performed, and creates one of more speech information items from which the noise has been removed.

Then, the POI provider 522 transmits one or more speech information items from which the noise has been removed, to the speech recognition server device 900. Then, the speech recognition server device 900 transmits to the relay server device 500, one or more information items of character string candidates as a result of recognition, obtained by subjecting each speech information item to a predetermined speech recognition process (step S505). It is to be noted that in this speech recognition process, processing such as already-existing speech recognition is carried out, and one of more character string candidates as a result of the recognition are outputted according to the N-best search, or the like, together with their degree of accuracy. By way of example, when the speech information outputted from the user corresponds to "pizza", the character string candidates; "piza", "pizza", "hiza", "ika", and the like, are outputted for each speech information.

Then, upon receipt of the character string information outputted as the recognition result, the POI provider 522 assigns weights to the recognition result (step S506). Specifically, the character string information as the recognition result being outputted includes one or more candidates depending on the noise removal algorithms. If there are included any redundant candidates, they are integrated to one, and the integrated candidate is corrected to have a higher degree of accuracy (e.g., a predetermined ratio of accuracy is added thereto). Then, the character string candidates are ranked in descending order of accuracy.

The POI provider 522 transmits the (more than one) character string candidates being ranked, to the POI provision server device 950, to send a request to search for a POI (S507).

The POI provision server device 950 conducts a fluctuation search for the POI which includes the transmitted character string candidate in its facility name or in its address or the like, or includes a character string similar to the transmitted character string candidate in its facility name or in its address or the like, retrieves multiple POI candidates organized by accuracy, and then transmits to the relay server device 500, a POI list including the name, coordinate, phone number, address, and the like, of the POI, in association with the character string candidate (step S508).

The POI provider 522 sends the POI list with respect to each character string candidate being transmitted, to the navigation device 100 (step S509).

The POI provision information creation part 106 uses the POI search result being received, creates a display screen showing each POI in selectable manner, and instructs the output processor 103 to display the POI on the display 2 (step S510). By way of example, the POI provision information creation part 106 displays a list of the restaurants providing pizza food, or the like, in a selectable manner for each character string candidate, when the selected candidates are "piza", "pizza", and "hiza", and creates a screen which displays an icon of each restaurant at a corresponding position, in association with the coordinate position of the restaurant.

Then, the basic controller 101 accepts via the input accepting part 102, a selection of the POI being displayed, and performs a route search assuming the selected POI as a destination or a via point (step S511). Upon searching for the route, the basic controller 101 displays a route searching message including the name of the POI being selected. By way of example, when the name of the POI being selected is "Tokyo pizza", the basic controller 101 displays a message, "Will search for a route to the Tokyo pizza", and conducts the route search for the route directed to the POI.

The flow of the POI searching process relating to the second embodiment has been described so far. According to the POI searching process relating to the second embodiment, it is possible to retrieve and present the POI, as to each of one or more character string candidates being recognized based on the speech information. Therefore, this allows further reduction of the user input operation and the user is able to utilize the high level searching function, more easily and simply. Specifically, it is possible to say that even though the processing capacity of the navigation device is not particularly high, speech recognition with a high degree of precision and the POI search function with a high functionality are available.

In the first embodiment, for example, as represented by the relevancy among the processes in FIG. 7, the navigation device 100 transmits the speech information after integrated at the end of the utterance, to the relay server device 500, and the like, but this is not the only example, here. In other words, while the speech information is uttered, it is also possible for the navigation device 100 to transmit the speech information to the relay server device 500, and the like, and the noise removal may be conducted sequentially. This process being modified as described above will be explained with reference to FIG. 12.

Firstly, the relay server communication part 105 of the navigation device 100 starts transmission of the speech information to the transmit and receive process (controlled by the POI provider 522) of the relay server device 500 (step S601).

It is to be noted that the relay server communication part 105 continues the transmission of the speech information until the transmission of the entire speech information is completed (step S607).

In the transmit and receive process of the relay server device 500, upon starting the transmission of the speech information, the POI provider 522 starts transmission of the speech information to the noise removal process that is controlled by the noise removal processor 521, without waiting for the end of the transmission of the speech information from the relay server communication part 105 (step S602). When transmission of all the speech information is completed, the transmission of the speech information to the noise removal process ends in the transmit and receive process of the relay server device 500 (step S608).

In the noise removal process, the noise removal processor 521 subjects the transmitted speech information to a predetermined noise removal process. The noise removal processor 521 of the relay server device 500 firstly determines the noise level in the silent portion during a predetermined time (e.g., 100 milliseconds) in the head of the received speech information, and decides one or more appropriate noise removal algorithms according to the noise level (step S603). Then, the noise removal processor 521 of the relay server device 500 applies thus decided noise removal algorithm, subjects the received speech information to the noise removal (step S604), and starts transmission of the speech information sequentially from the portion where the noise has been removed, to the server communication process controlled by the POI provider 522 (step S605). It is to be noted that when transmission of all the speech information from which the noise has been removed is completed, the transmission of the speech information to the server communication process ends in the noise removal process of the relay server device 500 (step S609).

Upon receipt of the speech information from which the noise has been removed, in the server communication process, the POI provider 522 starts transmitting sequentially the speech information from which the noise has been removed, sent from the noise removal process, to the speech recognition server device 900 (step S606). It is to be noted here that if speech information items exist respectively for the noise removal algorithms, the POI provider 522 transmits all the multiple speech information items to which various noise removal algorithms have been applied.

Then, at the end of transmission of the speech information from which the noise has been removed, in the server communication process of the relay server device 500, the transmission of the speech information to the speech recognition server device 900 ends (step S610).

The speech recognition server device 900 subjects thus received one or more speech information items from which the noise has been removed, to a predetermined speech recognition process, and specifies one or more character string candidates obtained as a result of the recognition, according to the N-best search (step S611).

Then, in the server communication process of the relay server device 500, the POI provider 522 receives all the character string candidates, transmitted from the speech recognition server device 900 (step S612).

In the server communication process of the relay server device 500, the POI provider 522 transfers all the received character strings to the transmit and receive process (step S613).

In the transmit and receive process of the relay server device 500, the POI provider 522 transmits the character string being a result of the recognition to the relay server communication part 105 of the navigation device 100 (step S614).

The modified example of the relevancy among the processes in the step S002 to S007 in the POI searching process has been described so far. It is to be noted here that as for the processes such as the noise removal (step S004) and assignment of weights on the recognition result (step S006), detailed explanation has been skipped in describing the relevancy among the processes.

According to the modification as described above, it is possible to carry out the processes in real time, from utterance of the speech information to the start of the speech recognition, and therefore, this moves ahead the start timing of the speech recognition process, thereby enhancing the responsivity.

There have been made explanations focusing on the preferred embodiments of the present invention. Each of the embodiments has been described, taking an example that applies the present invention to the navigation device, or the like. However, the present invention is not only applied to the navigation device but to any information terminals, in general. Furthermore, in each of the embodiments, the processes performed in the navigation device 100 and the processors used to perform those processes may be provided on other terminal devices (e.g., a cell phone, a smart-phone, and the like, via the communication unit 12), and a part of those processes may be distributed between the navigation device 100 and other terminal devices.

What is claimed is:
1. A server device comprising:
a speech information receiver adapted to receive speech information from a predetermined information terminal via a network;
a noise removal processor adapted to remove noise information from the speech information, the noise removal processor configured to apply multiple noise removal algorithms to create multiple speech information items from which the noise has been removed;
a speech information transmitter adapted to transmit the speech information items from which the noise has been removed to a predetermined speech recognizer via the network;
a character string receiver adapted to receive, via the network, a plurality of character string candidates as a result of recognition of the speech information items by the speech recognizer;

a character string transmitter adapted to transmit a plurality of character string candidates, via the network, to a predetermined POI provider for providing POI (Point of Interest) information associated with the character string candidate, the character string transmitter configured:

i) to assign weights to the plurality of character string candidates depending on the noise removal algorithms previously applied to each corresponding speech information item; and ii) based on the selected application of noise removal algorithms to each speech information item, to give greater importance to corresponding character string candidates considered as having relatively high recognition precision;

a POI information receiver adapted to receive, via the network, the POI information associated with the character string; and a POI information transmitter adapted to transmit the POI information to the information terminal.

2. The server device according to claim 1, wherein the server device further comprises:

a character string candidate transmitter adapted to transmit multiple character string candidates to the information terminal; and a selected character string receiver adapted to receive from the information terminal one selected character string candidate selected from the multiple character string candidates;

wherein the character string candidate transmitter is configured to transit, via the network, said selected one character string candidate to the POI provider.

3. The server device according to claim 1, wherein, when multiple character string candidates are included as the character string received by the character string receiver, the character string transmitter is configured to transmit the multiple character string candidates to the POI provider via the network, and the POI information receiver is configured to receive multiple POI information items being associated with the multiple character string candidates, respectively.

4. The server device according to claim 1, further comprising a redundancy elimination device adapted to eliminate redundancy of POI by selectively integrating together received redundant character string candidates to produce an integrated candidate having an associated higher degree of accuracy, the higher degree of accuracy of the integrated candidate allowing ranking of the integrated candidate relative to other character string candidates received by the server device from the speech recognizer.

5. The server device according to claim 1, wherein, when the speech information receiver starts receiving the speech information from the predetermined information terminal via the network, the noise removal processor is configured to remove the noise information sequentially from the speech information being received, and the speech information transmitter is configured to transmit the speech information items, from which the noise removal processor has removed the noise, sequentially to the predetermined speech recognizer via the network.

6. A searching system having an information terminal and a server device communicating with the information terminal via a network, wherein the information terminal comprises:

an audio receiver adapted to accept an input of speech information;

a communication device adapted to establish communication with the server device via the network;

an output device;

a POI specifying device adapted to transmit the speech information accepted by the audio receiver to the server device, and receiving information specifying a candidate of a POI (Point Of Interest) associated with the speech information, a POI candidate output device adapted to output to the output device, the information specifying the candidate of the POI received by the POI specifying unit, and a route searching device adapted to accept a selective input of the information specifying the candidate of the POI, and search for a route directed to the POI, and wherein the server device includes a speech information receiver adapted to receive speech information from a predetermined information terminal via a network;

a noise removal processor adapted to remove noise information from the speech information, the noise removal processor configured to apply multiple noise removal algorithms to create multiple speech information items from which the noise has been removed;

a speech information transmitter adapted to transmit the speech information items from which the noise has been removed to a predetermined speech recognizer via the network;

a character string receiver adapted to receive, via the network, a plurality of character string candidates as a result of recognition of the speech information items by the speech recognizer;

a character string transmitter adapted to transmit a plurality of character string candidates, via the network, to a predetermined POI provider for providing POI (Point of Interest) information associated with the character string candidate, the character string transmitter configured:

i) to assign weights to the plurality of character string candidates depending on the noise removal algorithms previously applied to each corresponding speech information item; and ii) based on the selected application of noise removal algorithms to each speech information item, to give greater importance to corresponding character string candidates considered as having relatively high recognition precision;

a POI information receiver adapted to receive, via the network, the POI information associated with the character string; and a POI information transmitter adapted to transmit the POI information to the information terminal.

7. A searching method of a searching system having an information terminal and a server device communicating with the information terminal via a network, the searching system comprising an audio receiver adapted to accept an input of speech information and an output device, and the searching method executing:

a transmitting step of transmitting the speech information accepted by the audio receiver to the server device;

a speech information receiving step of receiving, via the network, the speech information from the information terminal;

a noise removing step of removing noise information from the speech information, the noise removing step applying multiple noise removal algorithms to create multiple speech information items from which the noise has been removed;

a speech information transmitting step of transmitting, via the network, the speech information from which the noise has been removed to a predetermined speech recognizer;

a POI information receiving step of receiving, via the network from a predetermined POI provider, POI (Point Of Interest) information associated with the speech information transmitted to the speech recognizer, a POI information transmitting step of transmitting the POI information to the information terminal;

a POI specifying step of receiving the POI information; and a POI candidate outputting step of outputting to the output device, the POI information received by the POI specifying step;

the method further including:

at a character string receiver in the server device, receiving, via the network, a plurality of character string candidates resulting from the recognition of the speech information items by the predetermined speech recognizer; and at a character string transmitter adapted to transmit a plurality of selected character string candidates, via the network, to the predetermined POI provider, i) assigning weights to a plurality of character string candidates depending on the noise removal algorithms previously applied to each corresponding speech information item; and ii) based on the selected application of noise removal algorithms to each speech information item, giving greater importance to corresponding character string candidates considered as having relatively high recognition precision.

8. The searching method of claim 7, wherein the server device further comprises:

a character string candidate transmitter adapted to transmit multiple character string candidates to the information terminal; and a selected character string receiver adapted to receive from the information terminal one selected character string candidate selected from the multiple character string candidates;

wherein the character string candidate transmitter is configured to transit, via the network, said selected one character string candidate to the POI provider.

9. The searching method of claim 7, wherein, when multiple character string candidates are included as the character string received by the character string receiver, the character string transmitter is configured to transmit the plurality of character string candidates to the POI provider via the network, and the POI information receiver is configured to receive multiple POI information items being associated with the multiple character string candidates, respectively.

10. The searching method of claim 7, further comprising eliminating redundancy of POI by selectively integrating together received redundant character string candidates to produce an integrated candidate having an associated higher degree of accuracy, the higher degree of accuracy of the integrated candidate allowing ranking of the integrated candidate relative to other character string candidates received by the server device from the speech recognizer.

11. The searching method of claim 7, wherein the noise removal processor uses multiple noise removing algorithms to create multiple speech information items from which the noise has been removed.

12. The searching method of claim 7, wherein, when the speech information receiver starts receiving the speech information from the predetermined information terminal via the network, a noise removal processor is configured to remove the noise information sequentially from the speech information being received, and the speech information transmitter is configured to transmit the speech information items, from which the noise removal processor has removed the noise, sequentially to the predetermined speech recognizer via the network.

* * * * *